United States Patent
Doi et al.

(10) Patent No.: US 6,298,382 B1
(45) Date of Patent: Oct. 2, 2001

(54) INFORMATION RETRIEVING METHOD, INFORMATION RETRIEVING SYSTEM, AND RETRIEVAL MANAGING UNIT FOR THE SAME

(75) Inventors: Tsunehisa Doi; Ikuo Miyoshi; Takeshi Sekine; Tatsuya Shindo, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/152,272

(22) Filed: Sep. 14, 1998

(30) Foreign Application Priority Data

Sep. 24, 1997 (JP) .................................... 9-258176
Aug. 25, 1998 (JP) ................................. 10-238418

(51) Int. Cl.7 .................................................. G06F 15/16
(52) U.S. Cl. ........................... 709/229; 709/225; 709/105
(58) Field of Search ................................... 709/219, 208, 709/226, 105, 104, 218, 225, 229; 340/825.5; 707/10; 711/150

(56) References Cited

U.S. PATENT DOCUMENTS

| | | | |
|---|---|---|---|
| 5,155,851 | * 10/1992 | Krishnan | 709/105 |
| 5,548,724 | * 8/1996 | Akizawa et al. | 709/203 |
| 5,668,993 | * 9/1997 | Peters et al. | 709/101 |
| 5,692,192 | * 11/1997 | Sudo | 709/105 |
| 5,774,660 | * 6/1998 | Brendel et al. | 709/201 |
| 5,774,668 | * 6/1998 | Choquier et al. | 709/223 |
| 5,796,954 | * 8/1998 | Hanif et al. | 709/231 |
| 5,835,755 | * 11/1998 | Stellwagen, Jr. | 707/3 |
| 5,920,854 | * 7/1999 | Kirsch et al. | 707/3 |
| 5,950,173 | * 9/1999 | Perkowski | 705/26 |
| 5,978,803 | * 11/1999 | Ooe | 707/10 |
| 5,983,228 | * 11/1999 | Kobayashi et al. | 707/10 |
| 5,991,792 | * 11/1999 | Nageswaran | 709/102 |
| 6,067,580 | * 5/2000 | Aman et al. | 709/330 |
| 6,085,186 | * 7/2000 | Christianson et al. | 707/3 |

OTHER PUBLICATIONS

Andrew's Metaguide, "Pushing the Meta–search Envelope", Traffic.com, Newsfeeds, No Date.*
Ponamgi et al., "Debugging multithread programs with MPD", ISSN: 0740–7459, IEEE Softeware, pp. 37–43, May 1991.*
Sohn et al., "Parallel Bidirectional Heuristic Search on the EM–4 multiprocessor", ISBN: 0–8186–6427–4, IEEE Symposium, pp. 100–107, Oct. 1994.*
Connolly et al., "An Extension to TCP: Partial Order Service", RFC 1693, pp. 1–36, Nov. 1994.*
Graham et al. "The Performance of Multithreading and scheduling on Client–Server Systems", ISBN: 0–7803–3873–1, pp. 87–93, Feb. 1997.*

* cited by examiner

*Primary Examiner*—Zarni Maung
*Assistant Examiner*—Jason D. Cardone
(74) *Attorney, Agent, or Firm*—Staas & Halsey LLP (57) ABSTRACT

A information retrieving method of realizing the improvement of retrieval performance without conducting fine-grain processing and allowing a parallelizing operation for sequential retrieval engines to be conducted easily. Accordingly, the information retrieving method according to this invention is made to connect retrieving servers in parallel with respect to a retrieval managing server through the use of a parallel framework which makes the retrieving servers conduct parallel processing by integrating the functions of the retrieving servers in a manner of directly using the functions thereof without changing. The data to be retrieved is distributed or substantially equally to the retrieving servers, while the retrieval requests from clients are successively broadcasted to the retrieving servers without waiting for the retrieval results from the retrieving servers. This invention can be effectively applied for fetching necessary information from a database retaining various kinds of information.

21 Claims, 9 Drawing Sheets

FIG. 9
RELATED ART

# INFORMATION RETRIEVING METHOD, INFORMATION RETRIEVING SYSTEM, AND RETRIEVAL MANAGING UNIT FOR THE SAME

BACKGROUND OF THE INVENTION

1) Field of the Invention

The present invention relates to an information retrieving method, information retrieving system and retrieval managing unit for this system which are for retrieving or searching and fetching necessary information from a database retaining various kinds of information.

2) Description of the Related Art

Recently, the quantity of documents converted into electronic form has rapidly been increasing with the progress of computer networks such as the Internet and the intranet. Accordingly, a service based upon an information retrieving system has developed to derive necessary information from these documents.

Figure 8:
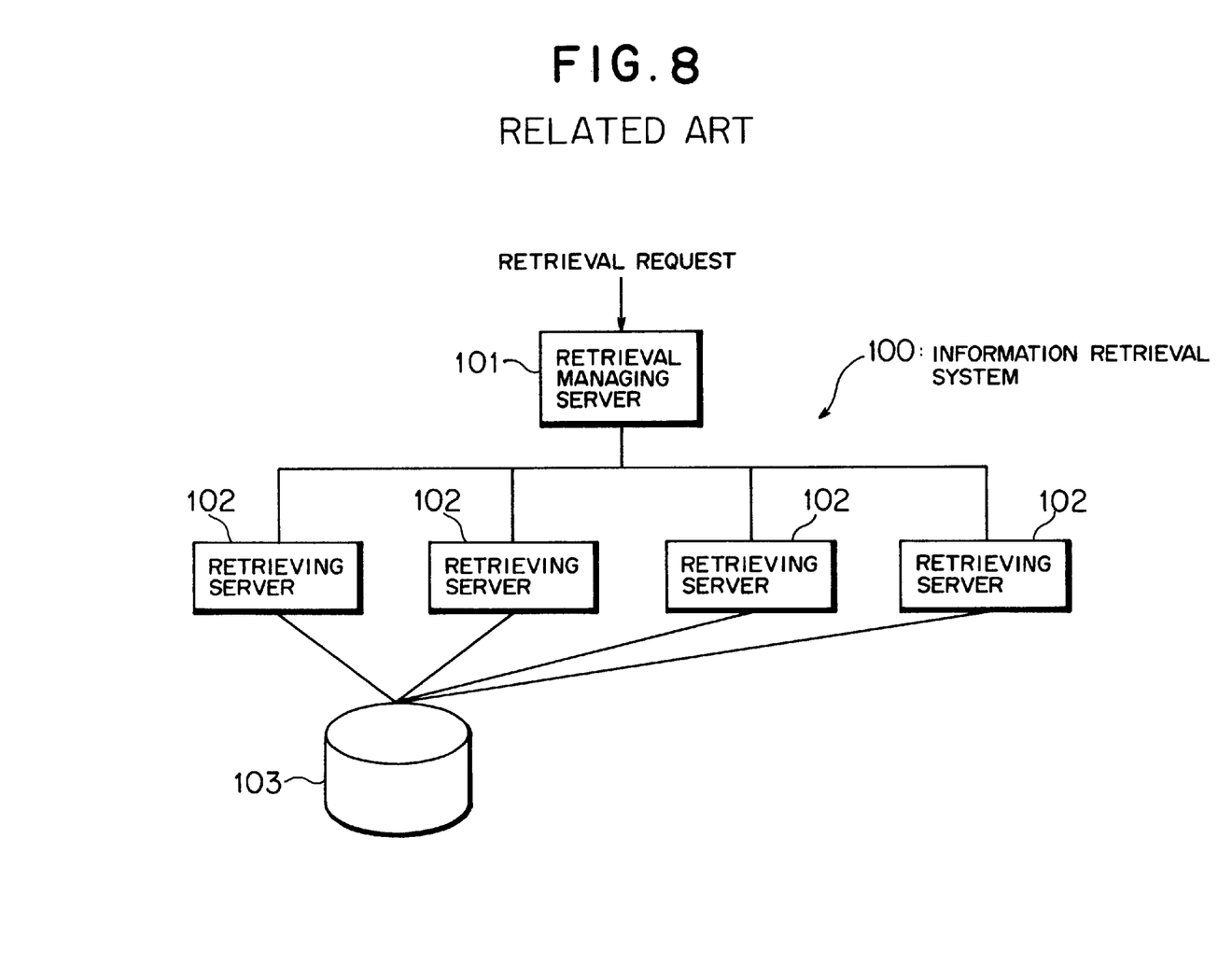
FIG. 8 is a block diagram showing the whole arrangement of a prior information retrieving system.

For instance, a system shown in FIG. 8 has been known as one of prior information retrieving systems. This information retrieving system shown in FIG. 8, designated generally at numeral 100, is made up of a retrieval managing server 101, a plurality of (4 in FIG. 8) retrieving servers 102 and a database 103.

The retrieval managing server 101 is for managing a retrieving operation in the plurality of retrieving servers 102, and in response to a retrieval request from a client (not shown), gives an instruction thereto for retrieval from the database 103. Each of the retrieving servers 102 is constructed to have a sequential or serial retrieval engine (not shown), and is made to conduct the retrieval from the database 103 in accordance with the instruction from the retrieval managing server 101, before forwarding or returning the retrieval result to the retrieval managing server 101. In the actual arrangement, the database 103 is held in a storage unit such as a disk unit.

In the information retrieving system 100 thus arranged, for the retrieval, the plurality of retrieving servers 102 gain access to the database 103 existing in one large area in parallel relation to each other (in a simultaneous access way). Usually, as compared with an operating speed of a CPU of a processor or a memory constituting each of the retrieving servers 102, the operating speed of the storage unit retaining the database 103 is considerably lower. For this reason, in the case that the plurality of retrieving servers 102 conduct the retrieval from one database 103 as mentioned above, each of the retrieving servers 102 frequently goes into a wait condition for the status of the storage unit, which results in lowering the retrieval efficiency.

Figure 9:
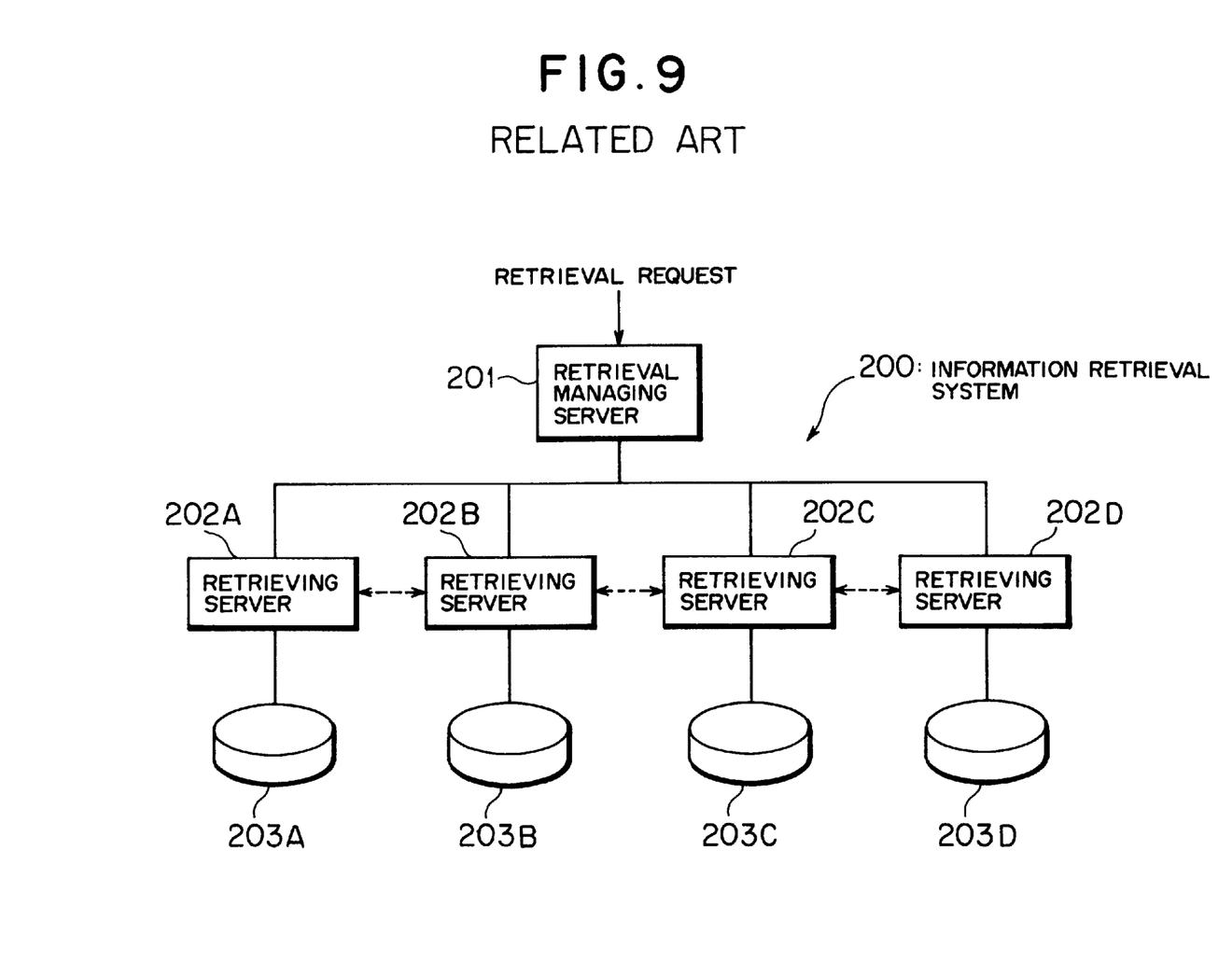
FIG. 9 is a block diagram showing the whole arrangement of another prior information retrieving system.

Therefore, for eliminating this problem, there has hitherto been proposed an information retrieving system 200 shown in FIG. 9. This information retrieving system 200 is, as well as the above-described information retrieving system 100, composed of a retrieval managing server 201 and a plurality of (4 in FIG. 9) retrieving servers 202A to 202D. In addition, in this information retrieving system 200, the database undergoing the retrieval is divided into four partial aggregations corresponding to the number of retrieving servers 202A to 202D, with the four sections being coupled as databases 203A to 203D with the retrieving servers 202A to 202D, respectively.

In this case, the retrieval managing server 201 is for managing the retrieval operations in the retrieving servers 202A to 202D, and in response to a retrieval request from a client (not shown), gives an instruction to each of the retrieving servers 202A to 202D for the retrieval from the corresponding one of the databases 203A to 203D. In addition, the retrieving servers 202A to 202D independently accomplish the retrieval from the divided databases 203A to 203D in accordance with the instruction from the retrieval managing server 201, respectively. In the actual arrangement, the databases 203A to 203D are held in a storage unit such as a disk unit.

With this arrangement, in this information retrieving system 200, the plurality of retrieving servers 202A to 202D conduct the retrieval from the divided databases 203A to 203D in an independent/parallel manner, respectively, which reduces the occurrence of the storage unit wait condition so that the retrieval efficiency is improvable.

Meanwhile, in recent years, the need for the improvement of the information retrieving performance has increasingly been occurring with the enlargement of the above-mentioned networks, and therefore, it is strongly desired that an information retrieving system which can meet the need for the improvement of the information retrieval performance appears successfully.

The aforesaid information retrieving system 200 can enhance the retrieval performance by conducting the processing called fine-grain processing.

Like the information retrieving system 200, in the case that the parallel processing is done through the use of a plurality of retrieving servers (processors) 202A to 202D, for enhancing the processing performance, it is preferable to equalize the load balances among the plurality of retrieving servers 202A to 202D. That is, the condition that all the retrieving servers 202A to 202D always takes charge of the same quantity of retrieval processing contributes to the highest retrieval efficiency. However, usually, there is almost no case that the quantity of retrieval processing is equally distributed to the retrieving servers 202A to 202D.

Accordingly, in a manner of conducting the fine-grain processing to more finely set the unit of the retrieval processing by the retrieving servers 202A to 202D, the load balances are equalized among the retrieving servers 202A to 202D, so that the retrieval performance is improvable.

More specifically, when receiving a retrieval request from a client, the retrieval managing server 201 finely divides, in a predetermined unit, the data to be retrieved (which will be referred hereinafter to as retrieval data) within each of the databases 203A to 203D respectively coupled with the retrieving servers 202A to 202D, and successively allocates non-processed retrieval data to the retrieving servers 202A to 202D which complete the retrieval processing of the retrieval data in the predetermined unit. Whereupon, the load balances among the retrieving servers 202A to 202D are made equal, thereby sharply heightening the retrieval efficiency.

However, the above-mentioned fine-grain processing must require the communications among the retrieving servers 202A to 202D as indicated by two-dot chain lines in FIG. 9 because there frequently occurs a case that the retrieving server (processor) the retrieval data belongs to differs from the retrieving server (processor) which conducts the retrieval processing of that retrieval data, thus causing a large amount of overhead.

In addition, if conducting the fine-grain processing, the retrieval managing server 201 is required to always grasp the internal processing status of a sequential retrieval engine body constituting each of the retrieving servers 202A to 202D which form the base of the information retrieving system 200. Thus, difficulty is experienced to directly use the sequential retrieval engines without modifying or changing them, that is, the internal arrangement of each of the sequential retrieval engines needs to be modified in parallelizing the sequential retrieval engines.

Accordingly, for constructing an information retrieving system, a detailed knowledge about the sequential retrieval engine body becomes necessary and a large number of steps must be performed for the sequential retrieval engine parallelizing processing and the fine-grain processing, so that it takes very much time to develop the information retrieving system.

Moreover, for this reason, even if a sequential retrieval engine is newly developed as the base of an information retrieving system, difficulty is encountered to directly or immediately introduce the new sequential retrieval engine into the information retrieving system, with the result that the information retrieving system can not catch up with the improvement of the performance of the sequential retrieval engine.

SUMMARY OF THE INVENTION

The present invention has been developed with a view to eliminating these problems, and it is therefore an object of this invention to provide an information retrieving method, information retrieving system and retrieval managing unit for the same system which are capable of realizing the improvement of the retrieval performance without conducting the fine-grain processing, and further, which is capable of simplifying the parallelizing operation on or for sequential retrieval engines to certainly meet the requirement for the improvement of the retrieval performance for a short period of developing time.

For this purpose, in accordance with the present invention, there is provided an information retrieving method of, when receiving a retrieval request from a client, controlling an operation of each of a plurality of retrieving servers through the use of a retrieval managing server to accomplish retrieval to (in accordance with) the retrieval request therefrom, wherein the plurality of retrieving servers are connected in parallel with respect to the retrieval managing server through the use of a parallel framework which makes the plurality of retrieving servers conduct parallel processing by integrating functions of the retrieving servers in a manner of directly utilizing the functions thereof without changing, and data to be retrieved is equally or substantially equally distributed to the plurality of retrieving servers to be put therein while retrieval requests from clients are successively broadcasted to the plurality of retrieving servers through the use of the parallel framework without waiting for the retrieval results from the plurality of retrieving servers.

In this case, it is also appropriate that the retrieval managing server constitutes a portion of the parallel framework, and broadcasts the retrieval requests from the clients in sequence to the plurality of retrieving servers through the use of a multithread feature or facility. In addition, it is also acceptable to successively broadcast the retrieval requests from the clients to the plurality of retrieving servers according to an asynchronous communication method.

Furthermore, an information retrieving system according to this invention comprises a plurality of retrieving servers for conducting retrieval processing and a retrieval managing server for receiving a retrieval request from a client and for controlling a retrieval operation of each of the plurality of retrieving servers, and further, includes a parallel framework which makes the plurality of retrieving servers conduct parallel processing by integrating functions of the retrieving servers in a manner of directly utilizing the functions thereof without changing, and which connects the plurality of retrieving servers in parallel with respect to the retrieval managing server, with data to be retrieved being equally or substantially equally distributed to the plurality of retrieving servers to be put therein, the parallel framework being equipped with a retrieval request outputting feature which successively broadcasts the retrieval requests from the clients to the plurality of retrieving servers without waiting for the retrieval results from the plurality of retrieving servers.

Still further, a retrieval managing unit for an information retrieving system according to this invention, which, when receiving a retrieval request from a client, controls an operation of each of a plurality of retrieving servers to make each of the plurality of retrieving servers conduct a retrieval operation in answer to the retrieval request therefrom, uses a parallel framework which makes the plurality of retrieving servers conduct parallel processing by integrating functions of the retrieving servers in a manner of directly utilizing the functions thereof without changing, with data to be retrieved being equally or substantially equally distributed to the plurality of retrieving servers to be put therein, the parallel framework establishing parallel connections among the plurality of retrieving servers, and the parallel framework being equipped with a retrieval request outputting feature for successively broadcasting the retrieval requests from the clients to the plurality of retrieving servers without waiting for the retrieval results from the plurality of retrieving servers.

In the information retrieving system and retrieval managing unit mentioned above, it is also appropriate that the retrieval request outputting feature is constructed with a multithread feature comprising a plurality of threads, and each of the retrieval requests from clients are allocated to one of the threads, and the thread broadcasts the retrieval request to the plurality of retrieving servers, and the thread, conducts processing of the retrieval result sent from the plurality of retrieving servers in answer to the retrieval request.

Moreover, in the above-mentioned information retrieving system and retrieval managing unit, it is also possible that the retrieval request outputting feature is constructed with an asynchronous communication facility for making communications with the plurality of retrieving servers in an asynchronous condition, and this asynchronous communication feature asynchronously broadcasts the retrieval requests from the clients in sequence to the plurality of retrieving servers and asynchronously receives the retrieval results coming from the plurality of retrieving servers in conjunction with the retrieval request.

Furthermore, in the above-mentioned information retrieving system, it is also acceptable that each of the retrieving server sides is provided with a retrieval result retaining section for preserving the retrieval result obtained within each of the retrieving servers in accordance with a retrieval request from the retrieval managing server, or that the retrieval managing server side is equipped with an aggregated result retaining section for preserving a result of aggregating or tabulating processing done on the basis of the retrieval results from the plurality of retrieving servers. An aggregated result retaining section similar thereto can also be provided in the above-mentioned retrieval managing unit.

Still further, in the above-mentioned information retrieving system, it is also acceptable that the retrieval managing server and at least one of the plurality of retrieving servers are constructed as the same processing unit.

In the information retrieving method, information retrieving system and retrieval managing unit mentioned above, through the use of the parallel framework, in addition to parallelizing the plurality of retrieving servers without modifying the respective retrieving servers (sequential retrieval engines), it is possible to easily incorporate a new retrieving server into the system without altering it. Moreover, along with parallelizing data in a manner of equally or substantially equally scattering or distributing the data undergoing the retrieval into the respective retrieving servers, by employing a way to parallelize control to successively broadcast the retrieval requests from the retrieval managing server to the respective retrieving servers, the enhancement of the operational efficiency of each of the retrieving servers is possible.

What's more, in the aforesaid information retrieving system, since the result of the retrieval performed within each of the retrieving servers in accordance with the retrieval request from the retrieval managing server is preserved in the retrieval result retaining section on each retrieving server side while the result of the aggregating processing conducted on the basis of the retrieval results is held in the aggregated result retaining section on the retrieval managing server side (retrieval managing unit), not only the useless communications between the retrieval managing server and the respective retrieving servers becomes unnecessary, but also the need for the preservation and management of the retrieval result forming a huge amount of data on the retrieval managing server side (retrieval managing unit) is eliminated.

Thus, the information retrieving method, information retrieving system and retrieval managing unit for the system according to this invention can offer the following effects and advantages.

(1) The use of the parallel framework extremely simplifies the parallelizing work of the sequential retrieval engines respectively contained in the retrieving servers, which allows answering the request for the enhancement of the retrieval performance within a short period of developing time.

(2) The simplification of the parallelizing work can sharply reduce the working quantity to be required when parallelized, and can realize the parallelizing operation or parallelized condition (which will sometimes be referred hereinafter to as parallelization) on the retrieving servers at a low development cost, so that a sequential retrieval engine developed by spending a lot of money can properly be incorporated into the system, and the parallelization of the retrieving servers becomes easily possible even in a distributed memory type parallel computer, with the result that a high scalability is realized and a necessary retrieval ability is certainly attained.

(3) Along with the data parallelization to equally or substantially equally distribute the retrieval data (data undergoing retrieval) to the respective retrieving servers, by employing the control parallelization to successively broadcast the retrieval requests from the retrieval managing server to the respective retrieving servers, the operational efficiency of each of the retrieving servers can improve, and therefore, a higher throughput performance is obtained and the considerable enhancement of the retrieval performance becomes feasible without conducting the fine-grain processing.

(4) The employment of the parallel framework allows the retrieval result or the aggregated result to be preserved in each of the retrieving servers or the retrieval managing server in a high independent condition, which can eliminate the need for the useless communications between the retrieval managing server and each of the retrieving servers, and which can eliminate the need for the preservation and management of a huge amount of retrieval result on the retrieval managing server side. Particularly, because the aggregated result made by the sort processing or the like is retained on the retrieval managing server side (the retrieval managing unit), there is no need to conduct the heavy processing such as the sort processing many times, thus further improving the performance of the information retrieving system.

DESCRIPTION OF THE PREFERRED EMBODIMENTS

An embodiment of the present invention will be described hereinbelow with reference to the drawings.

Figure 1:
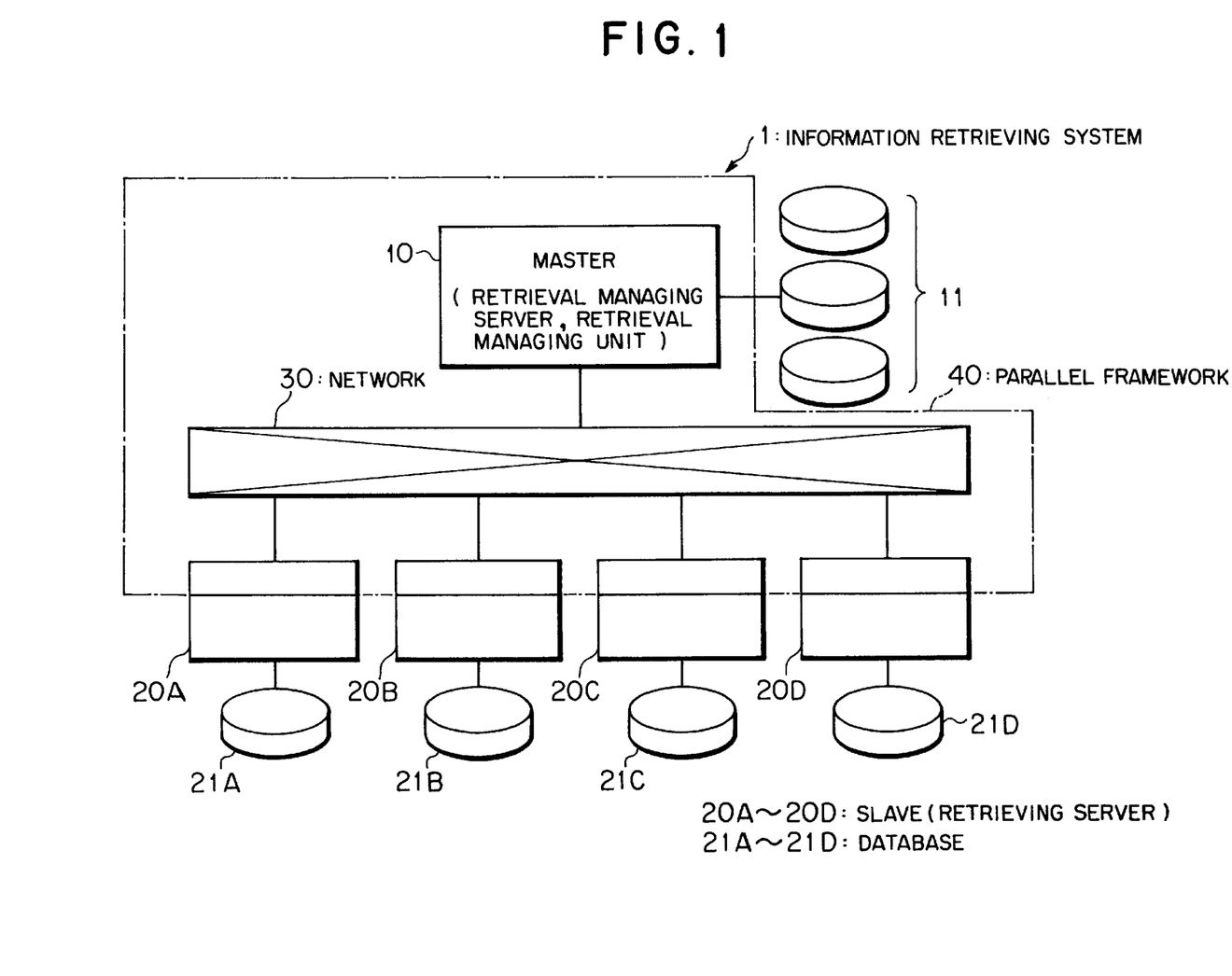
FIG. 1 is a block diagram showing the whole arrangement of an information retrieving system according to an embodiment of the present invention.
Figure 2:
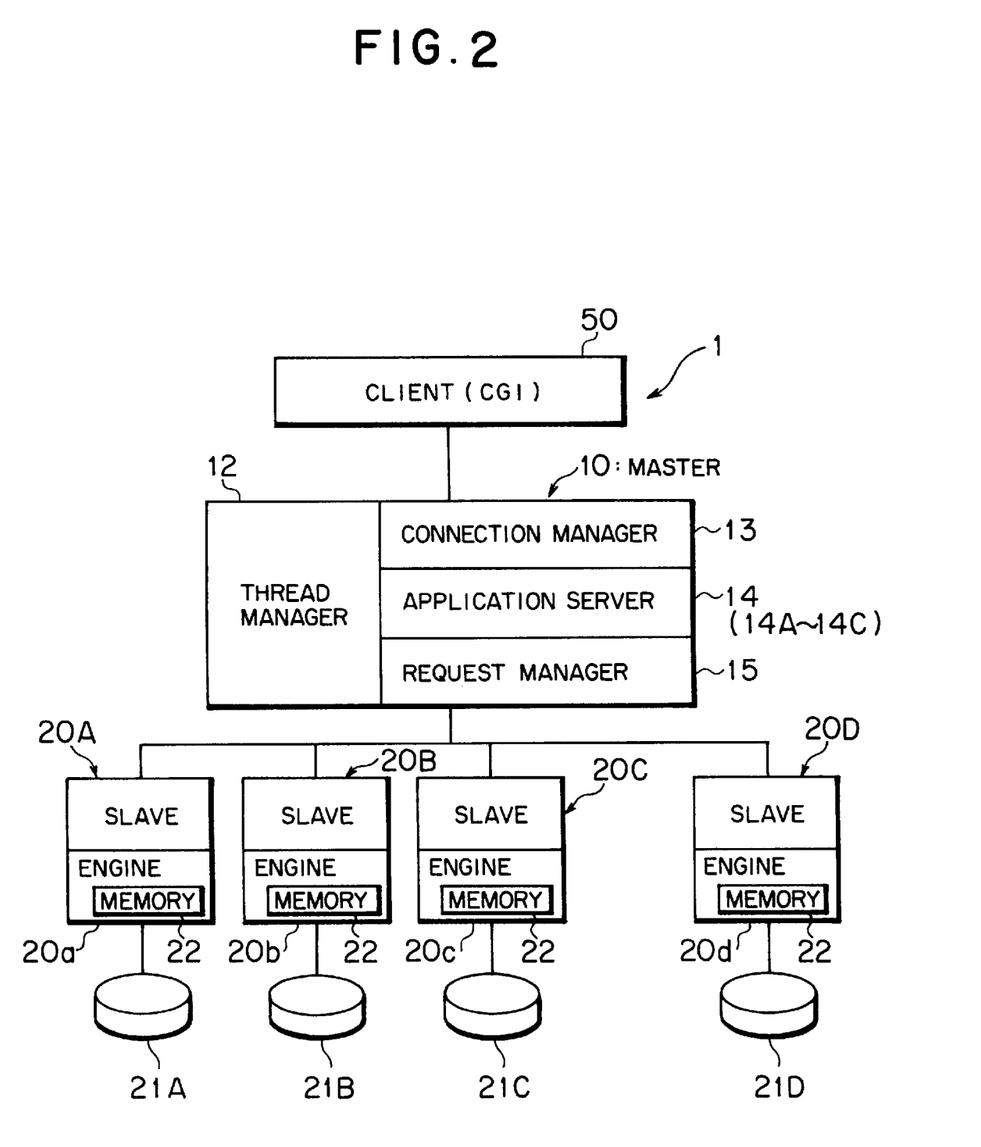
FIG. 2 is a block diagram showing a detailed arrangement of the information retrieving system according to this embodiment.
Figure 3:
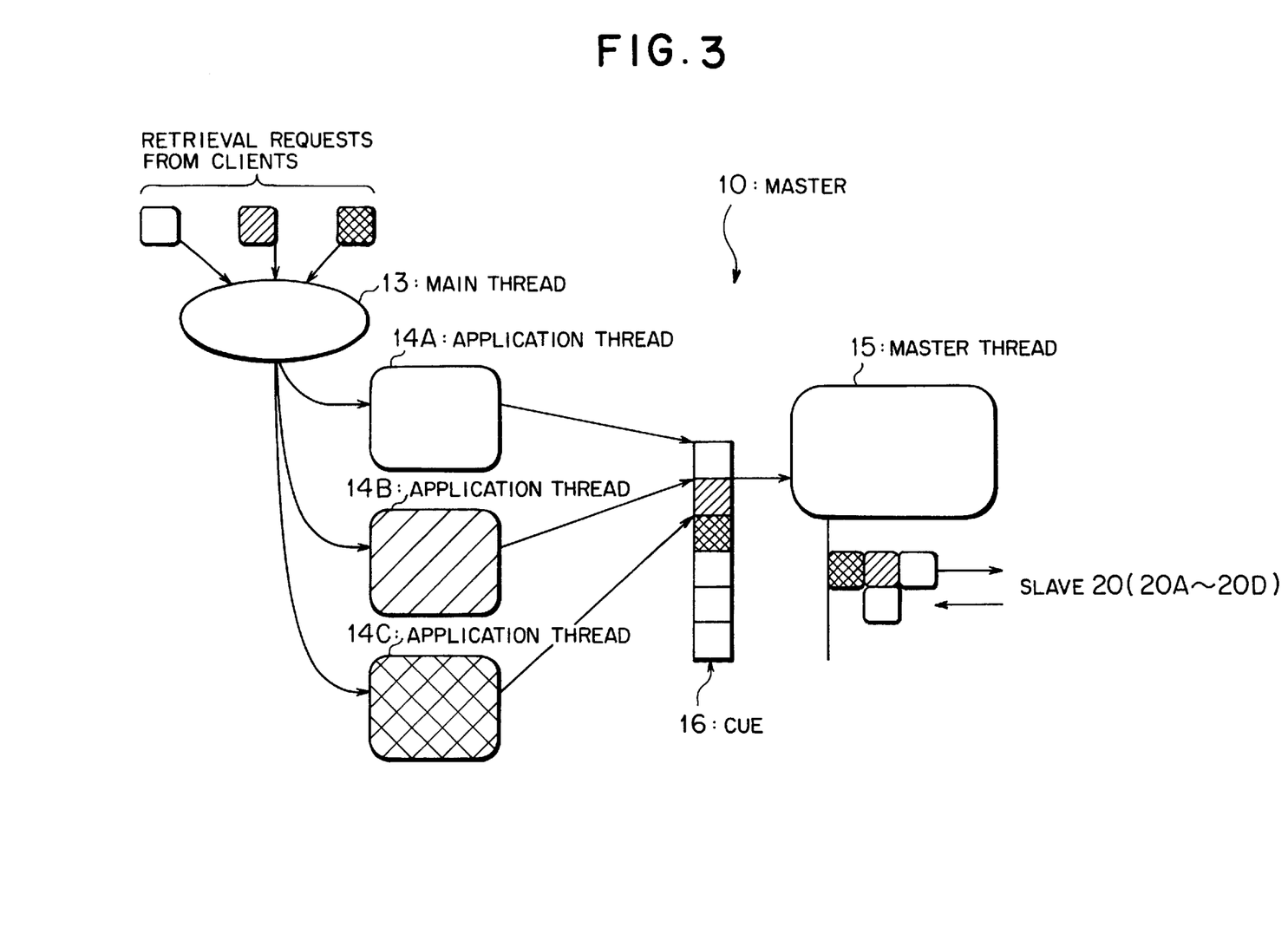
FIG. 3 is a block diagram showing a detailed arrangement of a master (a retrieval managing server, a retrieval managing unit for an information retrieving system) in the information retrieving system according to this embodiment.

FIGS. 1 to 3 are illustrations of an arrangement of an information retrieving system according to an embodiment of this invention. Of these drawings, FIG. 1 is a block diagram showing the whole system arrangement, FIG. 2 is a block diagram showing a detailed system arrangement, and FIG. 3 is a block diagram showing a detailed arrangement of a master (a retrieval managing server, a retrieval managing unit for the system) employed for the system.

As shown in FIG. 1, the information retrieving system according to this embodiment, generally designated at numeral 1, comprises a master 10, a plurality of (4 in this embodiment) slaves 20A to 20D, and a network 30.

The master 10 serves as a retrieval managing server (a retrieval managing unit for an information retrieving system) to receive a retrieval request from a client 50 (see FIG. 2) such as a CGI (Common Gateway Interface) for controlling a retrieval operation of each of the slaves 20A to 20D, and is also called master server or search manager. Its detailed arrangement will be described hereinafter with reference to FIGS. 2 and 3.

Furthermore, the master 10 has a function to conduct aggregating or tabulating processing such as sorting on the basis of the retrieval results from the slaves 20A to 20D, and an external storage unit (aggregated result retaining section) 11 is coupled with the master 10 to preserve the aggregated result (the entity of the retained aggregation). That is, the aggregated result falls under control on the master 10 side.

The slaves (retrieving servers) 20A to 20D contain sequential retrieval engines 20a to 20d (see FIG. 2), respectively, and independently take charge of the actual retrieval processing on databases 21A to 21D in accordance with an instruction (retrieval request) from the master 10, and forward the retrieval results to the master 10. These slaves 20A to 20D are also called search servers.

Each of the sequential retrieval engines 20a to 20d has a memory 22 serving as a retrieval result retaining section to preserve the retrieval result accomplished in each of the slaves 20A to 20D in accordance with the retrieval request from the master 10, and the entity of the retrieval result preservation aggregation comes under the management on the slaves 20A to 20D side.

Moreover, in the information retrieving system 1 according to this embodiment, the retrieval data (a group of documents) is equally or substantially equally divided into four partial aggregations corresponding to the number of slaves 20A to 20D, which in turn, are scatteringly located with respect to (or distributed to) the slaves 20A to 20D, respectively. Incidentally, in fact, each of the databases 21A to 21D is constructed as being a storage unit such as a disk unit.

A network 30 is interposed between the master 10 and the slaves 20A to 20D to allow the mutual communications between the master 10 and the slaves 20A to 20D. The network 30 is not shown in the illustration of FIG. 2.

Furthermore, in the information retrieving system 1 according to this embodiment, the plurality of slaves 20A to 20D (sequential retrieval engines 20a to 20d) are connected through the parallel framework 40 in parallel with respect to the master 10. This parallel framework 40 is software or a feature to integrate the functions of the engines 20a to 20d in a manner of directly utilizing them with no modification or alteration, and conceptually, as shown in FIG. 1, it is constructed to include the master 10, the network 30 and a portion of the slaves 20A to 20D.

A more detailed description will be made hereinbelow of the parallel framework 40.

In many server applications based upon a client-server model, in answer to each of large quantities of processing requests occurring from clients, a server returns the processing result to the client. On the other hand, in an application dealing with a large volume of data, there has generally been known a way in which a plurality of processors divisionally take charge of the object or candidate data to gain a response speed, or a way in which, contrary to this, a plurality of processors share the object data to achieve a processing throughput.

The parallel framework signifies a module produced such that a for-client section (1), for-processing-engine section (2) and parallel control section (3), which will be described herein later, are combined to make processing engines (the sequential retrieval engines 20a to 20d), originally designed to conduct sequential operations, accomplish parallel processing as a whole without greatly modifying the processing engines.

The for-client section (1) receives a processing request from a client (see numeral 50 in FIG. 2) and returns the processing result to that client, while the for-processing-engine section (2) is for making the processing engines (sequential retrieval engines 20a to 20d) fulfill the processing request.

That is, in the parallel framework, the basic operation of the server application that receives a processing request from a client and returns the results of the processing done in the processing engines to the client is divided into two which in turn, are accomplished in the for-client section (1) and the for-processing-engine section (2).

Furthermore, the parallel control section (3) provided between the for-client section (1) and the for-processing-engine section (2) distributes each processing request to a plurality of processing engines operating in a plurality of processors [slaves (retrieving servers) 20A to 20D] in a processing unit, and collects the processing results therefrom.

In the embodiment of this invention, the extraction of two kinds of parallel configurations or characteristics, that is, the employment of the data parallelization and the control parallelization, realizes the parallel framework 40 whereby a high performance is achievable.

The parallel framework 40 in this embodiment comprises the master 10 taking charge of the reception and distribution of a processing request from the client 50 and the slaves (retrieving servers) 20A to 20D causing the processing by the sequential retrieval engines 20a to 20d, and in this case, the master 10 functions as the above-mentioned for-client section (1) and parallel control section (3), while each of the slaves 20A to 20D serves as the for-processing-engine section (2).

A brief description will be given hereinbelow of one example of realization of the foregoing parallel framework. In this example, the parallel framework 40 employs a construction in which a connection type communication line is used for the client-server communications and threads respectively corresponding to the clients are produced in the master 10 so that the threads and the clients assume the one-by-one relation.

The for-client section (1) establishes the client-server connection in response to a connection request from a client, and at the same time, produces threads (see numerals 14A to 14C in FIG. 3) corresponding thereto. Each of the threads receives a processing request from the client through the connection therebetween, and writes that processing request as a processing unit in a processing request cue (see numeral 16 in FIG. 3), and informs the parallel control section (3) of the fact of the arrival of a new request. After the completion of the processing to the request written in the processing request cue, each of the threads receives the notice about that completion from the parallel control section (3) and communicates the processing result to the client, and subsequently, deletes the corresponding request from processing request cue.

The parallel control section (3) transfers a new request to the slaves (see numerals 20A to 20D in FIG. 2) needed for the processing of the new request, and at this time, adds a tag in units of request. In addition, the parallel control section (3) transfers the retrieval processing result each of the slaves accomplishes to the master, and finds the threads needing that result by reference to the aforesaid tag, and further, gives that result to the corresponding thread in the for-client section (1).

Each of the processing engines (sequential retrieval engines; see numerals 20a to 20d in FIG. 2) in the slaves conducts processing one by one with respect to the processing requests successively coming from the master, and returns the processing result with a tag to the parallel control section (3). The for-processing-engine section (2) makes each of the processing engines conduct the aforesaid processing. Incidentally, it is also possible that the processing engines (2) are made to operate sequentially.

In this embodiment, the master 10 has a retrieval request outputting feature [equivalent to the aforesaid parallel control section (3)] which successively broadcasts a retrieval request from each of clients to the slaves 20A to 20D without waiting for the retrieval results from the slaves 20A to 20D. Particularly, the master 10 in this embodiment is, as shown in FIGS. 2 and 3, constructed as a multithread feature comprising a plurality of threads, and the aforesaid retrieval request outputting feature is made with that multithread feature. That is, the master 10 is composed of a thread manager 12, a connection manager 13, an application server 14 (14A to 14C), a request manager 15, and a cue 16.

The thread manager 12 is for managing the whole multithread feature (threads 13 to 15), and particularly, is for controlling an operating condition of the application server 14 (14A to 14C) which will be mentioned herein later. In FIG. 3, the thread manager 12 is omitted from the illustration.

The connection manager [main thread; equivalent to the aforesaid for-client section (1)] 13 receives a retrieval request from a client 50 (not shown in FIG. 3), and further, returns the retrieval results or the aggregated result to the client 50 issuing the retrieval request.

The application server [application thread; equivalent to the foregoing for-client section (1)] 14 actually comprises a plurality of threads 14A to 14C as shown in FIG. 3, and undertakes retrieval processing allocated at every retrieval request the connection manager 13 receives. Each of the threads 14 (14A to 14C) to which the retrieval processing is allocated starts due to the aforesaid thread manager 12, and after outputting the retrieval request to the slaves 20A to 20D, its operation goes into stop by the thread manager 12 until the slaves 20A to 20D return the retrieval results to the retrieval request. In addition, each of the threads 14 (14A to 14C) works to conduct the aggregating processing such as sort processing on the basis of the retrieval results.

The cue 16 works to temporarily hold retrieval requests outputted from the threads 14 (14A to 14C) in the outputting order, although not shown in FIG. 2.

The request manager [master thread; equivalent to the above-mentioned parallel control section (3), that is, the retrieval request outputting feature] 15 successively reads out the retrieval requests retained in the cue 16 to broadcast them to the slaves 20A to 20D, and further, receives the retrieval results returning from the slaves 20A to 20D to hand over the retrieval results to the given threads 14 (14A to 14C) made to deal with them.

That is, in this embodiment, the retrieval requests from the respective clients are successively allocated to the threads 14 (14A to 14C) which in turn, successively broadcast the retrieval requests through the master thread 15 to the plurality of slaves 20A to 20D, while conducting the processing on the retrieval results returning from these slaves 20A to 20D in accordance with the retrieval requests.

Secondly, referring suitably to FIGS. 4 to 7, a description will be taken hereinbelow of an operation of the information retrieving system according to this embodiment.

As described above, in this embodiment, the sequential retrieval engines 20a to 20d are parallelized through the parallel framework 40. By the use of this parallel framework 40, the master 10 taking charge of the reception and distribution of a retrieval request is coupled through the network 30 to the salves 20A to 20D respectively containing the bodies of the sequential retrieval engines 20a to 20d, so that the parallelization of these engines 20a to 20d becomes feasible without any modification (alteration). In addition, a new sequential retrieval engine (retrieving server) can readily be built into the information retrieving system 1.

Figure 4:
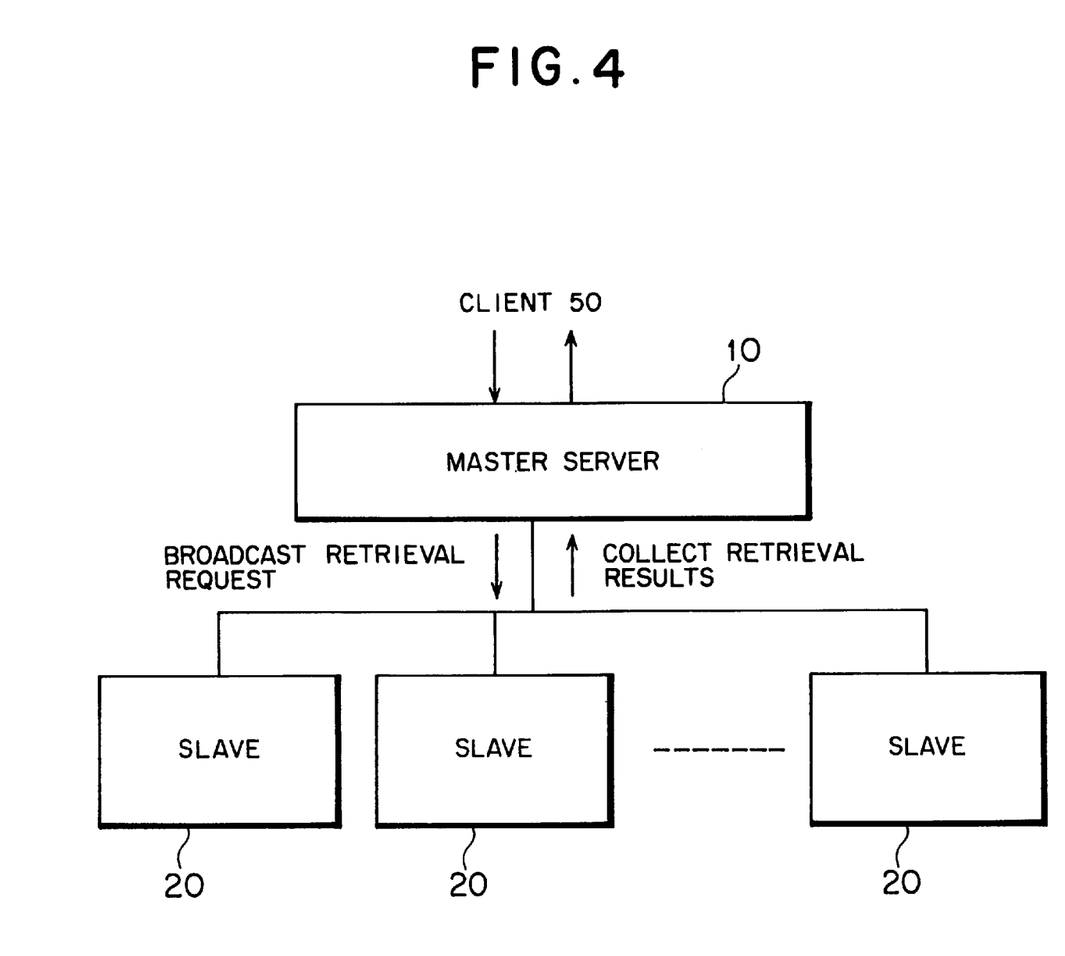
FIG. 4 is a block diagram useful for explaining an operation of the master in the information retrieving system according to this embodiment.

Furthermore, in this embodiment, as shown in FIG. 4, the master 10 receives a retrieval request from the client(s) 50 and distributes (broadcasts) that request to the slaves 20 (20A to 20D), and further, collects and aggregates the retrieval results from these slaves 20 (20A to 20D) to return the collection and aggregation to the client 50. This portion exists only within the parallel framework 40, and therefore, there is no need to modify the bodies of the sequential retrieval engines 20a to 20d. In FIG. 4, the plurality of slaves respectively containing the sequential retrieval engines are marked with the numeral 20, and the entire arrangement of the information retrieving system 1 is schematically shown in a state of improving no limitation in the number of slaves. The following description will sometimes be made with the numeral 20 being given to the slaves.

The slaves 20A to 20D actually effecting the retrieval have the sequential retrieval engines 20a to 20d forming the bases therein, respectively, and respectively call the sequential retrieval engines 20a to 20d for the retrieval execution in accordance with a retrieval request from the master (master server) 10. In this arrangement, the portion for making the communications between the bodies of the sequential retrieval engines 20a to 20d and the master 10 to call the engines 20a to 20d in accordance with the retrieval request is clearly separated from the engines 20a to 20d and is included in the parallel framework 40 side.

Still further, in this embodiment, the entity of the retained aggregation of the retrieval results achieved by the respective slaves 20A to 20D is managed in the memories 22 on the slaves 20A to 20D sides, whereupon there is no need to make the useless communications between the master 10 and the slaves 20A to 20D. On the other hand, since the entity of the retained aggregation based upon the aggregating processing such as sort in the master 10 is preserved and managed in the external storage unit 11 on the master 10 side, there is no need to conduct the heavy processing such as the sort many times, which contributes to the improvement of the system performance.

Moreover, in this embodiment, through the employment of the data parallelization that the retrieval data is equally or substantially equally distributed to the slaves 20 (20A to 20D) and the control parallelization that retrieval requests are successively sent from the master 10 to the slaves 20, the operational efficiency of each of the slaves 20 is improvable. That is, the achievement of a high performance is made by the extraction of the two kinds of parallelizations: the data parallelization and the control parallelization.

In general, in retrieving the information, most of the time taken for the retrieval execution is consumed for the access to the database and for the retrieval processing. This time has a property of lengthening depending upon the scale of the database undergoing the retrieval. However, there is no dependent relation among these document groups (retrieval data), and the whole retrieval result is attainable by dividing the document groups into a plurality of partial document groups and, further, by independently retrieving these partial document groups to aggregate the retrieval results. In this embodiment, by making the use of this property, the retrieval data is simply divided equally or substantially equally and the sequential retrieval engines 20a to 20d are placed which respectively take charge of the retrieval of the divided data, thereby extracting or providing the data parallel configuration.

Figure 5A:
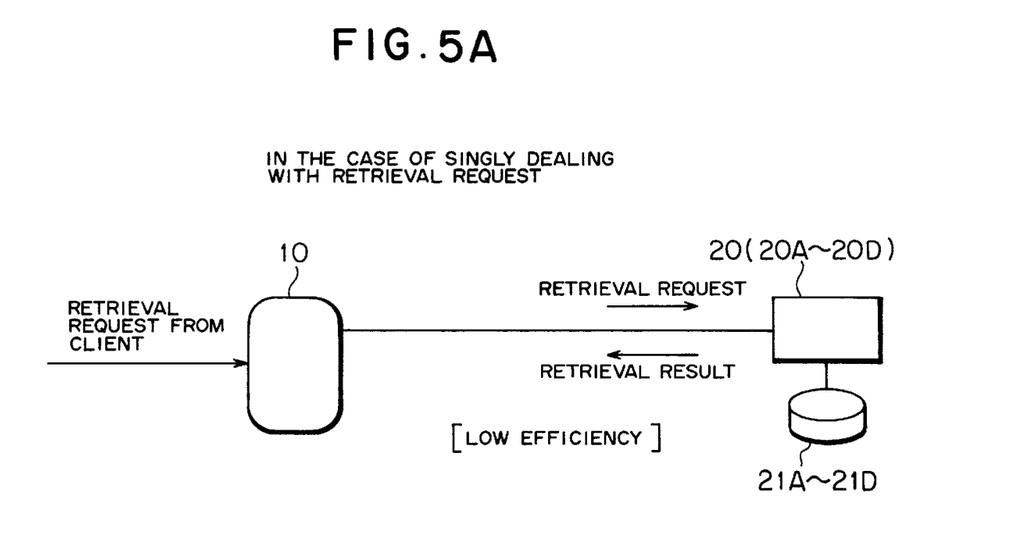
FIGS. 5A and 5B are illustrations available for describing an operation of the information retrieving system according to this embodiment.
Figure 6:
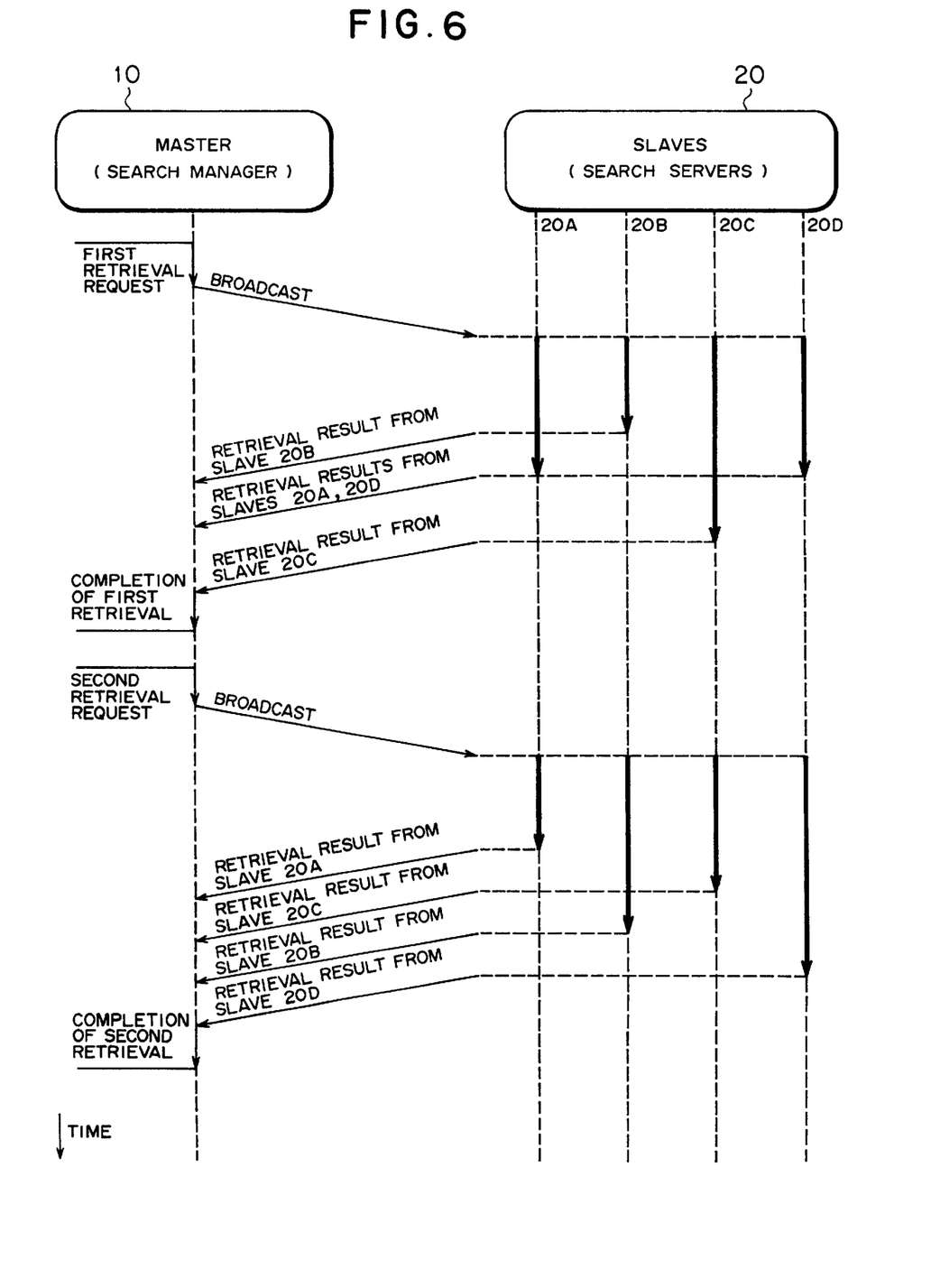
FIGS. 6 and 7 are illustrations available for describing an operation of the information retrieving system according to this embodiment.

However, as shown in FIGS. 5A and 6, in the case that, after outputting a retrieval request, the master 10 waits for the return of the retrieval results corresponding to the retrieval request from all the slaves 20 (20A to 20D), the slaves 20 which complete the retrieval at an earlier stage must wait for the next retrieval request. Accordingly, if only the data parallelization takes place, the rate of operation of the slaves 20 actually taking charge of the retrieval does not considerably increase.

Figure 5B:
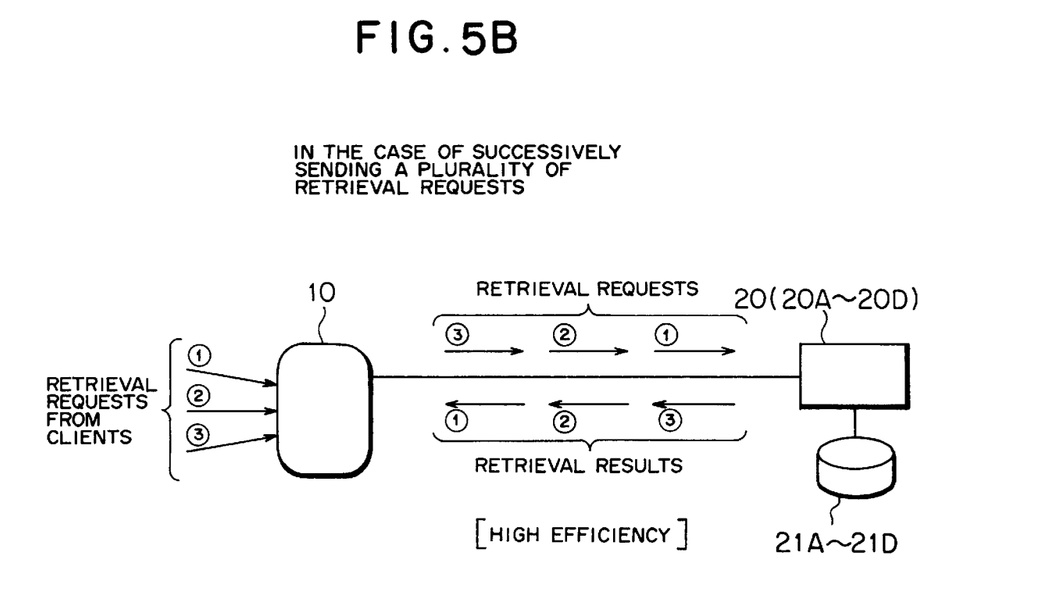
Figure 7:
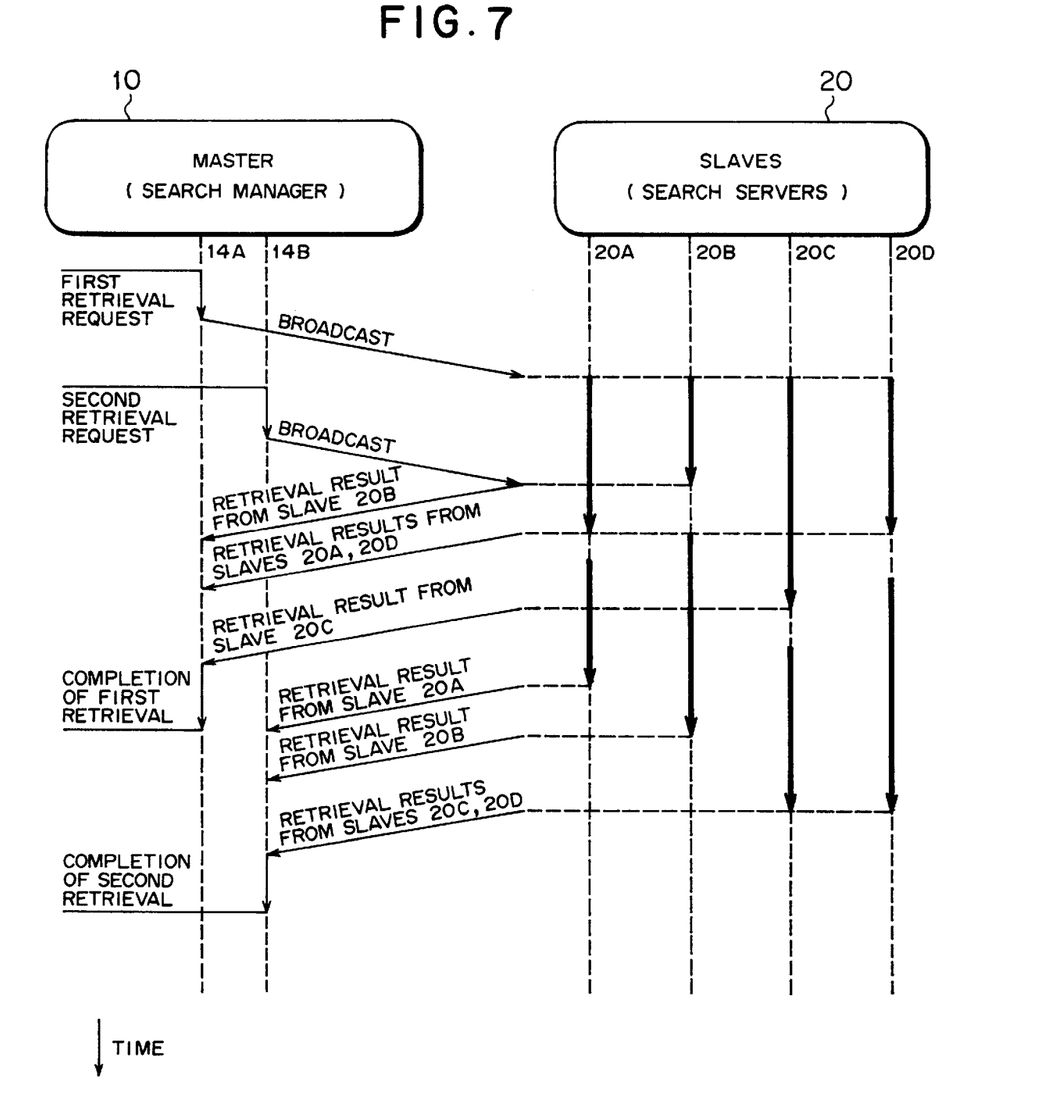

For this reason, in this embodiment, in addition to the data parallelization, the control parallel parallelization among the retrieval requests is taken on the master 10 side, and as shown in FIGS. 5B and 7, the retrieval request is successively forwarded from the master 10 to the slaves 20 (20A to 20D), thereby accomplishing a high throughput.

In more detail, when the main thread 13 of the master 10 receives a retrieval request from the client 50, the thread manager 12 selects a proper application thread 14 and starts it, and further, performs the allocation of the retrieval requests. The threads 14 (14A to 14C), receiving the allocation of the retrieval requests, output the retrieval requests to the slaves 20A to 20D.

The retrieval requests are temporarily held in the cue 16 in the outputting order, and then, are successively read out by the master thread 15 to be broadcasted through the network 30 to the slaves 20A to 20D.

The threads 20A to 20D sides temporarily put the retrieval requests in a cue (not shown), and the retrieval processing are successively conducted in the respective sequential retrieval engines 20a to 20d in accordance with the retrieval request held in the cue, with the retrieval results being brought back through the network 30 to the master 10. In the case that the master 10 side does not immediately require the retrieval results, the retrieval results are held in the memories 22 of the engines 20a to 20d.

Furthermore, the retrieval results returning from the slaves 20A to 20D are received by the master thread 15 and handed over to the given threads 14 (14A to 14C) which treat the retrieval results. Due to the thread manager 12, the threads 14 (14A to 14D) assume the stopping condition until all the slaves 20A to 20D return the retrieval results, and when receiving the retrieval results from all the slaves 20A to 20D, they conduct the aggregating processing such as sort on the basis of the retrieval results, and send back the retrieval results or the aggregated result to the client 50.

Although the two control systems (application threads 14) dealing with the retrieval request in a parallel condition are illustrated in FIG. 7, this invention is not limited to this number, it is also acceptable to employ three or more control systems as shown in FIG. 3.

Still further, an ID for identifying the threads 14 handling the retrieval request is given to the same retrieval request to be transmitted from the master 10 to each of the slaves 20, and the same ID is added to the retrieval result from each of the slaves 20 to the master 10 in order to specify the retrieval request fulfilled, and hence, the master thread 15 hands over the retrieval results to the given threads 14 (14A to 14C) by referring to that ID.

As described above, according to the information retrieving system 1 constituting the embodiment of this invention, the use of the parallel framework 40 permits the extreme simplification of the parallelizing work of the sequential retrieval engines 20a to 20d respectively contained in the slaves 20 (20A to 20D), thus surely meeting the requirement for the enhancement of the retrieval performance for a short developing time period.

In addition, owing to the simplification of the parallelizing work, the working quantity for the parallelization is sharply reduced and the parallelization of the sequential retrieval engines 20a to 20d (slaves 20) is realized at less developing expenses, so that high-performance sequential retrieval engines 20a to 20d, which are developed at an enormous cost, can properly be incorporated into the system 1, and further, the parallelization of the sequential retrieval engines 20a to 20d (slaves 20) becomes easily possible even in a distributed memory type parallel computer, with the result that a high scalability is realized and a necessary retrieval ability is certainly attained.

Furthermore, along with the data parallelization that the retrieval data is equally or substantially equally distributed to the slaves 20 (20A to 20D), the employment of the control parallelization that retrieval requests are successively broadcasted from the master 10 to the slaves 20 can enhance the operational efficiency of each of the slaves 20, with the result that a higher throughput performance is attained and the retrieval performance is sharply improvable without conducting the fine-grain processing.

Still further, the employment of the parallel framework 40 allows the retrieval results or the aggregated result to be retained in the slaves 20 or the master 10 in a high dependency condition, which can eliminate the useless communications among the master 10 and the slaves 20, and which does not require the preservation and management of a great deal of retrieval results on the master 10 side. Particularly, because the aggregated result made by the sort processing or the like is retained on the master 10 side, there is no need to conduct the heavy processing such as the sort processing many times, thus further improving the performance of the information retrieving system 1.

Although, in the above-described embodiment, the retrieval request outputting feature in the master 10 is constructed with a multithread feature, this invention is not limited to this feature, but it is also possible that the retrieval request outputting feature is constructed with an asynchronous communication facility for making communications with the plurality of retrieving servers in an asynchronous condition, and this asynchronous communication feature asynchronously broadcasts the retrieval requests from the clients in sequence to the plurality of slaves 20 and asynchronously receives the retrieval results coming from the plurality of slaves 20 in conjunction with the retrieval request. Even in this case, the same effects as those of the above-described embodiment are also obtained.

In this case, an ID for identifying the origin of the retrieval request is given to the same retrieval request to be transmitted from the master 10 to each of the slaves 20, and the same ID is added to the retrieval result from each of the slaves 20 to the master 10 in order to specify the retrieval request fulfilled, and hence, the master 10 side decides, by referring to that ID, whether or not to return all retrieval results originating from a given retrieval request.

In the above-described information retrieving system 1, the master 10 and at least one of the plurality of slaves 20 can also be made with the same processing unit (processor element).

It should be understood that the present invention is not limited to the above-described embodiment, and that it is intended to cover all changes and modifications of the embodiments of the invention herein which do not constitute departures from the spirit and scope of the invention.

What is claimed is:

1. An information retrieving system comprising:
a plurality of retrieving servers, each of which contains a sequential retrieval engine, conducting retrieval processing;
a retrieval managing server receiving a retrieval request from a client and controlling a retrieval operation of each sequential retrieval engine of each of said plurality of retrieving servers; and
a parallel framework causing said plurality of retrieving servers to conduct parallel processing by directly using and integrating unmodified operations of said retrieving servers, and connecting said plurality of retrieving servers in parallel with respect to said retrieval managing server,
wherein data to be retrieved are substantially equally distributed to said plurality of retrieving servers, and said parallel framework comprises a retrieval request outputting unit to provide parallel control of retrieval operations of said plurality of retrieving servers by broadcasting retrieval requests from clients to said plurality of retrieving servers without waiting to receive retrieval results from all of said plurality of retrieving servers, and said parallel framework further comprising a calling operation separate from said sequential retrieval engines.

2. An information retrieving system as defined in claim 1, wherein said retrieval request outputting feature of said parallel framework is provided in said retrieval managing server, and is configured with an asynchronous communication feature for making communications with said plurality of retrieving servers in an asynchronous condition, and said asynchronous communication feature asynchronously broadcasts said retrieval requests from said clients in sequence to said plurality of retrieving servers and asynchronously receives retrieval results coming from said plurality of retrieving servers in answer to said retrieval requests.

3. An information retrieving system as defined in claim 2, wherein each of said retrieving server sides is provided with a retrieval result retaining section for preserving said retrieval result obtained in each of said retrieving servers in accordance with said retrieval request from said retrieval managing server.

4. An information retrieving system as defined in claim 2, wherein said retrieval managing server side is equipped with an aggregated result retaining section for preserving a result of aggregating processing done on the basis of said retrieval results from said plurality of retrieving servers.

5. An information retrieving system as defined in claim 2, wherein said retrieval managing server and at least one of said plurality of retrieving servers are configured as the same processing unit.

6. An information retrieving system as defined in claim 1, wherein said retrieval request outputting feature of said parallel framework is provided in said retrieval managing server, and is configured with a multithread feature comprising a plurality of threads, and each of said retrieval requests from said clients are allocated to one of said threads, and the thread broadcasts the retrieval request to said plurality of retrieving servers, and the thread conducts processing of a retrieval result achieved in said plurality of retrieving servers in answer to the retrieval request.

7. An information retrieving system as defined in claim 6, wherein each of said retrieving server sides is provided with a retrieval result retaining section for preserving said retrieval result obtained in each of said retrieving servers in accordance with said retrieval request from said retrieval managing server.

8. An information retrieving system as defined in claim 6, wherein said retrieval managing server and at least one of said plurality of retrieving servers are configured as the same processing unit.

9. An information retrieving system as defined in claim 6, wherein said retrieval managing server side is equipped with an aggregated result retaining section for preserving a result of aggregating processing done on the basis of said retrieval results from said plurality of retrieving servers.

10. An information retrieving system as defined in claim 1, wherein each of said retrieving server sides is provided with a retrieval result retaining section for preserving said retrieval result obtained in each of said retrieving servers in accordance with said retrieval request from said retrieval managing server.

11. An information retrieving system as defined in claim 1, wherein said retrieval managing server side is equipped with an aggregated result retaining section for preserving a result of aggregating processing done on the basis of said retrieval results from said plurality of retrieving servers.

12. An information retrieving system as defined in claim 1, wherein said retrieval managing server and at least one of said plurality of retrieving servers are configured as the same processing unit.

13. An information retrieving system, comprising:
a retrieval managing unit receiving a retrieval request from a client and controlling an operation of a sequential retrieval engine, one of which is contained within each of a plurality of retrieving servers, to make said sequential retrieval engine conduct a retrieval operation in accordance with said retrieval request, said retrieval managing unit using a parallel framework that causes said plurality of retrieving servers to conduct parallel processing by directly using and integrating unmodified operations of said retrieving servers, said parallel framework comprising a calling operation separate from said sequential retrieval engines to call said sequential retrieval engines, with data to be retrieved being substantially equally distributed to said plurality of retrieving servers, said parallel framework establishing parallel connections among said plurality of retrieving servers, and said parallel framework comprising a retrieval request outputting unit for broadcasting retrieval requests from clients to said plurality of retrieving servers one after another without waiting to receive retrieval results from all of said plurality of retrieving servers, to provide parallel control of retrieval operations of said plurality of retrieving servers.

14. A retrieval managing unit for an information retrieving system as defined in claim 13, wherein said retrieval request outputting feature is configured with a multithread feature comprising a plurality of threads, and each of said retrieval requests from said clients are allocated to one of said threads, and the thread broadcasts the retrieval request to said plurality of retrieving servers, and the thread conducts processing of a retrieval result achieved in said plurality of retrieving servers in answer to the retrieval request.

15. A retrieval managing unit for an information retrieving system as defined in claim 14, further comprising an aggregated result retaining section for preserving a result of aggregating processing conducted on the basis of said retrieval results from said plurality of retrieving servers.

16. A retrieval managing unit for an information retrieving system as defined in claim 13, wherein said retrieval request outputting feature is configured with an asynchronous communication feature for making communications with said plurality of retrieving servers in an asynchronous condition, and said asynchronous communication feature asynchronously broadcasts said retrieval requests from said clients in sequence to said plurality of retrieving servers and asynchronously receives retrieval results coming from said plurality of retrieving servers in answer to said retrieval requests.

17. A retrieval managing unit for an information retrieving system as defined in claim 16, further comprising an aggregated result retaining section for preserving a result of aggregating processing conducted on the basis of said retrieval results from said plurality of retrieving servers.

18. A retrieval managing unit for an information retrieving system as defined in claim 13, further comprising an aggregated result retaining section for preserving a result of aggregating processing conducted on the basis of said retrieval results from said plurality of retrieving servers.

19. An information retrieving method of, when receiving a retrieval request from a client, controlling an operation of a sequential retrieval engine, one of which is contained within each of a plurality of retrieving servers through the use of a retrieval managing server to accomplish retrieval in accordance with said retrieval request, said method comprising:

connecting said plurality of retrieving servers in parallel with respect to said retrieval managing server using a parallel framework that causes said plurality of retrieving servers to conduct parallel processing by directly using and integrating unmodified operations of said retrieving servers, said parallel framework comprising a calling operation separate from said sequential retrieval engines to call said sequential retrieval engines;

substantially equally distributing data to be retrieved to said plurality of retrieving servers; and broadcasting retrieval requests from clients to said plurality of retrieving servers one after another using said parallel framework without waiting to receive retrieval results from all of said plurality of retrieving servers to provide parallel control of retrieval operations of said plurality of retrieving servers.

20. An information retrieving method as defined in claim 19, wherein said retrieval managing server constitutes a portion of said parallel framework, and broadcasts said retrieval requests from said clients in sequence to said plurality of retrieving servers through the use of a multi-thread feature.

21. An information retrieving method as defined in claim 19, wherein said retrieval managing server constitutes a portion of said parallel framework, and broadcasts said retrieval requests from said clients in sequence to said plurality of retrieving servers according to an asynchronous communication method.

* * * * *